(12) United States Patent
Fritschi et al.

(10) Patent No.: US 9,407,458 B2
(45) Date of Patent: Aug. 2, 2016

(54) METHOD AND APPARATUS FOR TRANSMITTING AN ASYNCHRONOUS TRANSPORT SIGNAL OVER AN OPTICAL SECTION

(71) Applicant: Alcatel Lucent, Boulogne Billancourt (FR)

(72) Inventors: Klaus-Dieter Fritschi, Nuremberg (DE); Gerhard Meyer, Nuremberg (DE); Jurgen Rahn, Nuremberg (DE); Wolfgang Thomas, Nuremberg (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/438,658

(22) PCT Filed: Nov. 22, 2013

(86) PCT No.: PCT/EP2013/074426
§ 371 (c)(1),
(2) Date: Apr. 27, 2015

(87) PCT Pub. No.: WO2014/086592
PCT Pub. Date: Jun. 12, 2014

(65) Prior Publication Data
US 2015/0288538 A1 Oct. 8, 2015

(30) Foreign Application Priority Data
Dec. 3, 2012 (EP) .................................. 12306506

(51) Int. Cl.
*H04B 10/04* (2006.01)
*H04L 12/46* (2006.01)
(Continued)

(52) U.S. Cl.
CPC ............ *H04L 12/4633* (2013.01); *H04B 10/27* (2013.01); *H04J 3/07* (2013.01); *H04J 3/1652* (2013.01); *H04J 2203/0089* (2013.01)

(58) Field of Classification Search
CPC ... H04J 14/02; H04J 14/0283; H04J 14/0246; H04J 3/1652; H04L 12/4633; H04Q 11/0066; H04Q 11/0003; H04B 10/27; H04B 10/032
USPC ........... 398/45, 58, 79, 43, 98, 99, 66, 52, 53, 398/55, 67, 72, 50, 48, 49, 182, 183, 202, 398/208, 135, 136, 141, 68; 370/539, 535, 370/473, 474, 476, 537
See application file for complete search history.

(56) References Cited

U.S. PATENT DOCUMENTS 8,374,186 B2 * 2/2013 Dong .................... H04J 3/1652
370/395.51
8,743,915 B2 * 6/2014 Shin ...................... H04J 3/1652
370/539

(Continued)

OTHER PUBLICATIONS

Ferrant, Jean-Loup et al., OTN Timing Aspects; IEEE Communications Magazine, IEEE Service Center, Piscataway, US; vol. 48, No. 9; Sep. 1, 2010; pp. 62-69; XP011317489; ISSN: 0163-6804.

(Continued)

*Primary Examiner* — Hanh Phan
(74) *Attorney, Agent, or Firm* — Patti & Malvone Law Group, LLC

(57) ABSTRACT

An exemplary method and apparatus are provided for transmitting an asynchronous transport signal over an optical fiber section of an Optical Transport Network. Higher order Optical Data Units of an asynchronous transport signal to be transmitted may be encapsulated into outer transport frames that offer a payload rate higher than a nominal bit rate of the asynchronous transport signal. An output optical signal, which contains the outer transport frames with the encapsulated asynchronous transport signal, is generated at a locally generated clock rate and transmitted over an optical fiber section. To encapsulate the asynchronous transport signal, its bit rate is adapted to the payload rate of the outer transport frames, which is derived from the locally generated clock through a justification and stuffing process. The rate adapted transport signal is then synchronously mapped into the outer transport frames at the rate of the locally generated clock.

14 Claims, 3 Drawing Sheets

(51) Int. Cl.
  *H04J 3/07* (2006.01)
  *H04J 3/16* (2006.01)
  *H04B 10/27* (2013.01)

(56) References Cited

U.S. PATENT DOCUMENTS

| | | |
|---|---|---|
| 2003/0016416 A1 | 1/2003 | Wolf |
| 2004/0156325 A1 | 8/2004 | Perkins et al. |
| 2007/0269218 A1 | 11/2007 | Zhang |

OTHER PUBLICATIONS

Jones, Mark Loyd; Mapping and Transport Standard for OTU4; Optical Fiber Communication (OFC), Collocated National Fiber Optic Engineers Conference, 2010 Conference on (OFC/NFOEC), IEEE, Piscataway, NJ, USA; Mar. 21, 2010; pp. 1-3; XP031676689.

Roese, Josef et al; Optical Transport Network Evolving with 100 Gigabit Ethernet; IEEE Communications Magazine, IEEE Service Center, Piscataway, US; vol. 48, No. 3, Mar. 1, 2010; pp. S28-S34; XP011305451; ISSN: 0163-6804.

Leven, Andreas et al; Real-Time Implementation of Digital Signal Processing for Coherent Optical Digital Communication Systems; IEEE Journal of Selected Topics in Quantum Electronics, vol. 16, No. 5, Sep./Oct. 2010; pp. 1227-1234.

International Telecommunication Union; Network Node Interface for the Synchronous Digital Hierarchy (SDH); Series G: Transmission Systems and Media, Digital Systems and Networks; ITU-T Standard G.707/Y.1322; Jan. 2007; 196 Pages.

International Telecommunication Union; Interfaces for the Optical Transport Network (OTN); Series G: Transmission Systems and Media, Digital Systems and Networks; ITU-T Standard G.709/Y.1331; Dec. 2009; 218 Pages.

International Telecommunication Union; Characteristics of Optical Transport Network Hierarchy Equipment Functional Blocks; Amendment 2; Series G: Transmission Systems and Media, Digital Systems and Networks; ITU-T Standard G.798/Amendment 2; Apr. 2012; 56 Pages.

\* cited by examiner

METHOD AND APPARATUS FOR TRANSMITTING AN ASYNCHRONOUS TRANSPORT SIGNAL OVER AN OPTICAL SECTION

FIELD OF THE INVENTION

The present invention relates to the field of telecommunications and more particularly to a method and related apparatus for transmitting optical signals in an Optical Transport Network.

BACKGROUND OF THE INVENTION

The ITU has defined in ITU-T G.709 the signals format and interfaces of the Optical Transport Network (OTN). The basic frame structure is an Optical Transport Module of size k (OTUk), where k can be 1, 2, 2e, 3, 3e2, or 4. It contains framing and section overhead plus a bit-synchronously mapped transport entity termed Optical Data Unit of size k (ODUk). An ODUk contains a payload area plus ODUk overhead. An Optical Payload Unit (OPUk) is mapped into the payload area and carries a client signal or other lower order ODUs being time-division multiplexed. OTUk signals are asynchronous within certain specified limits of typically ±20 ppm.

To create an OTU frame, a client signal rate is first adapted at the OPU layer. The adaptation contains adjusting the client signal rate to the OPU rate. The OPU overhead contains information to support the adaptation of the client signal. The adapted OPU is then mapped into the ODU. The ODU overhead contains overhead bytes that allow end-to-end supervision and tandem connection monitoring. Finally, the ODU is mapped into an OTU, which provides framing as well as section monitoring and forward error correction (FEC).

In an Optical Transport Network, connections are switched on ODU level. The ODU is thus the switchable transport entity that travels along a network path. A characteristic feature of OTN is the asynchronous operation and the bit synchronous mapping of ODUk into OTUk, which results in the fact that a received ODUk, which gets connected to another output of the network node, determines the clock of the OTUk signal at the output.

The start of an OTUk frame is detected by scanning for a frame alignment signal (FAS). Once the FAS is found the receiving network element is aligned to the clock and frame phase of the incoming signal and stops scanning through the incoming signal. In this state an network element checks whether the FAS is at the expected position of an incoming frame. A network element that forwards a frame overwrites the FAS of the received signal on egress to compensate potential bit errors in the incoming FAS.

During network operation, it can happen that phase shifts occur e.g. due to connection switching, insertion or removal of maintenance signals, etc. These phase shifts are detected by an network element as it does not find the FAS at the expected location in the incoming signal. When a FAS is not found at the expected position for six consecutive frames, the network element starts scanning for a new FAS position and aligns itself to the new frame position within two frames. It thus takes 8 frames until a network element aligns itself to a phase shift of an incoming signal. The OTN standards require that during this 8 frame periods, the network element continues to write a FAS into the outgoing signal at the expected frame start position.

SUMMARY OF THE INVENTION

In the case of frame and/or phase transients of the OTU/ODU frame and clock, a phase or frame transient will propagate through the network enforcing the different nodes in a chain to subsequently re-synch in terms of frame and frequency alignment. The reason is the fixed alignment of the OTUk to the ODUk frame. As to the bit synchronous mapping of an ODUk into the OTUk, also the optical transmission processes and synchronization will be affected by the frequency/phase transient. This will create a hit to the traffic and the re-synch time will be incremented at each node the transient passes.

In particular, for the 8 frames a network element requires to realign in case of a phase shift, a downstream network element will still find a FAS at the expected position and will start to detect the phase shift only after the upstream network element has aligned itself to the new phase. This takes another 8 frames. Therefore the phase shift builds up along the path and takes 8 frames per network element in the path.

The inventors have considered that with the introduction of coherent optical transmission, this problem is severely increased due to the fact that coherent optical receivers are sensitive to phase and frequency transients. While an OTN framer needs 8 frames to realign to a new phase and frequency, which corresponds to approximately 25 microseconds or less at rates of 40 G and higher, a coherent optical receiver will require much longer (e.g. in the ms range) to adjust to a phase and frequency transient. The impact on the network can thus be in the range of tens of milliseconds, which cannot be tolerated. Therefore, a method and related network element are required which avoid the impact of a phase and frequency shift on the OTN network.

These and other objects that appear below are achieved by a method of transmitting an asynchronous transport signal over an optical fiber section of an Optical Transport Network. The asynchronous transport signal has a frame structure referred to as Optical Transport Units, where each Optical Transport Unit contains a frame alignment signal and a higher order Optical Data Unit with an overhead section and a payload section. The Optical Data Unit represents a switchable transport entity within the Optical Transport Network and is synchronously mapped into the corresponding Optical Transport Unit. The asynchronous transport signal will be encapsulated into outer transport frames that offer a payload rate higher than a nominal bit rate of the asynchronous transport signal. An output optical signal, which contains the outer transport frames with the encapsulated asynchronous transport signal, is generated at a locally generated clock rate and transmitted over the optical fiber section.

To encapsulate the asynchronous transport signal, its bit rate is adapted to the payload rate of the outer transport frames, which is derived from the locally generated clock, through a justification and stuffing process. This eliminates any frame phase or frequency transients occasionally appearing in the received asynchronous transport signal. The rate adapted transport signal is then synchronously mapped into the outer transport frames at the rate of the locally generated clock.

BRIEF DESCRIPTION OF THE DRAWINGS

Preferred embodiments of the present invention will now be described with reference to the accompanying drawings in which.

DETAILED DESCRIPTION OF THE INVENTION

Figure 1:
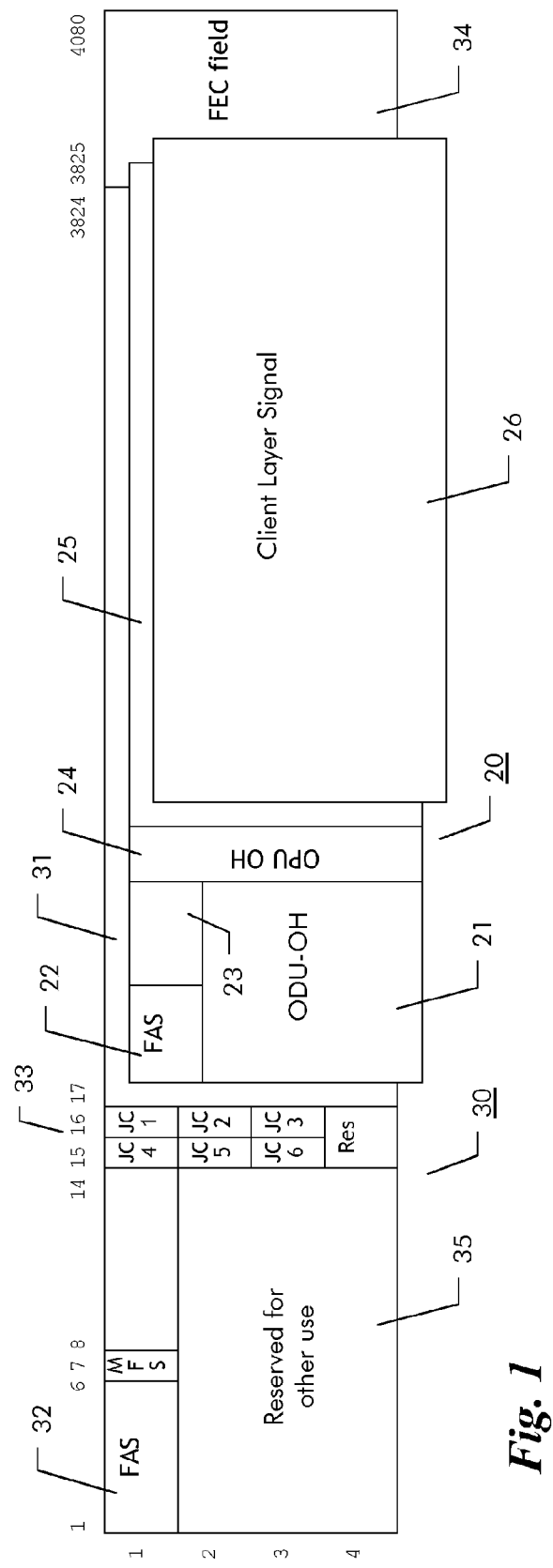
FIG. 1 shows an OTUk signal encapsulated into an outer transport frame structure.

In OTN transmission in the case of phase transients of the OTU/ODU frame and clock, a frame phase or frequency transient will propagate through the network enforcing the different nodes in a chain to subsequently re-synchronize in terms of frame and frequency alignment. The reason is the fixed alignment of the OTUk to the ODUk frame. As to the bit synchronous mapping of an ODUk into the OTUk, also the optical transmission processes and synchronization will be affected by a frequency or frame phase transient. This will create a hit to the traffic and the re-synchronization time will be incremented at each node the transient passes. This effect is described also in ITU-T Rec. G.798 in a note in section 14.5.1.1.2 currently published in G.798 Amendment 2 (April/ 2012).

Such transients appear in networks subsequent to sections affected by protection switches and/or switching to or clearing from replacement signals transport such as AIS or OCI. As explained before, this creates accumulated hits in OTN networks.

In the case of very high transmission rate, such frequency or frame phase jump does also create a loss of lock of timing recovery circuits related to the parallel processing of the signals in interfaces of optical modules and digital signal processing, for instance in DSP devices, that are required for coherent transmission. Re-synchronization time are much longer and thus even more disturbing than the normal OTN frame alignment hit described before. The signal hit is significantly longer than the one created by the concatenated framer re-synchronization.

According to embodiments of the invention, this signal interruption is avoided by an asynchronous transport mapping of the ITU-T Rec. G.709 compliant OTUk/ODUk frames into an outer transport format which supports a slightly higher rate. A separate justification and stuffing mechanism is applied to synchronize the OTUk/ODUk signals to the payload data rate of the outer transport frame, which encapsulate the native G.709-compliant OTUk/ODUk signal.

The signal line clock of the resulting output signal is independent of the transported OTUk/ODUk clock and a flexible stuffing method for adaptation to different transport formats as TDM (Time Division Multiplex), Cell based, or packet PDU can be is used.

For instance methods such as AMP (Asynchronous Mapping Procedure) or GMP (Generic Mapping Procedure) known from the OTN ITU-T Rec. G.709 format or pointer based methods known from SDH described in ITU-T Rec. G.707, or also the Residual Time Stamp (RTS) method in case of packet or cell based server layer implementation, can be employed as stuffing and rate adaptation mechanism.

The stuffing and rate adaptation mechanism, when used at high rates and appropriate justification granularity, ensures that the total maximum value of phase noise will be limited to 1 μs or less. This ensures that the additional jitter/wander amplitude is small so that the OTUk/ODUk services can also be used for synchronized services without degradation.

The mentioned encapsulation will avoid accumulation of a phase or frequency discontinuity passing through the network. As a result, a phase/frequency transient will have no effect on the re-synchronization of coherent high speed optics and no realignment of the signal processing in the coherent receiver is needed, as those timing domains are decoupled.

The ODUk of the signal to be transported over the coherent link is encapsulated into a link related frame structure that allows a asynchronous transport of the HO ODU in a server frame synchronised to the coherent transport and not affected by OTUk frame noise or jumps. Actually, what is encapsulated is the received ODUk including the received FAS, but excluding any FEC. The signal can thus also be referred to as an OTUk with FEC removed, since FEC will be terminated and any error corrected at the input where the OTUk signal is received.

An embodiment of the transport of an ODUk encapsulated into an outer transport frame is shown in FIG. 1. ODUk 20 contains an ODU overhead field 21, a field for a frame alignment signal 22, a field 23 for OTU overhead, and an OPU with an OPU overhead 24 and a payload area 25. A client signal 26 is mapped into the OPU payload area 25. Client signal 26 can be either a signal being mapped using an AMP or GMP mapping, or may be composed of lower order ODUs, as defined in ITU-T G.709, which latest version of February/ 2012 is hereby incorporated by reference herein.

G.709 requires that a network node in order to transmit ODUk 20 re-inserts the frame alignment signal FAS and the OTU overhead into fields 22 and 23 and adds FEC bytes to create an output signal that is then sent over an optical section. However, according to the subject embodiment, a new, outer transport frame 30 is created at a local clock to carry ODUk 20.

Transport frame 30 contains a payload area 31, a frame alignment signal 32, an overhead field 33 with justification control bytes JC1-JC6, and a FEC field 34. The subject embodiment makes use of the well known OTUk frame structure for the outer transport frame, too. As a consequence, additional overhead fields 35 are available, which can be left unused of reserved for other purposes.

Frame alignment signal 32 is a 6 bytes field which carries the words OA1 and OA2, three times each, where OA1="1111 0110" and OA2="0010 1000". In Byte 7 a multiframe alignment signal MFS can be added if used for other overhead processing.

Transport frame 30 is an octet oriented organized structure of 4 rows by 3824 columns plus 256 additional columns for FEC in this embodiment. The higher order ODUk to be transported, for example ODU3 of nominal approximately 40,319, 218.983 kbit/s±20 ppm or ODU4 of nominal approximately 104,794,445.815 kbit/s±20 ppm is encapsulated into 3808 bytes of transport frame 30.

In total, transport frame 30 has a structure of 4080 columns by 4 rows. Columns 1-5 of row 1 represent overhead fields and contain FAS 32. Columns 15 and 16, usually termed OPU overhead, carry justification control bytes JC1-JC6, columns 17-3824 transport the encapsulated higher order ODUk 20 and columns 3825-4080 are available for FEC bytes.

Since transport frame 30 is generated at a local unsynchronized clock, the mapping of ODUk signal 20 is asynchronous. A justification and rate adaptation mechanism is used to adjust the rate of the ODUk to the payload data rate of transport frame 30. In the embodiment, the well known Generic Mapping Procedure (GMP) as defined in G.709 is used for the justification and rate adaptation.

As a consequence of the asynchronous mapping into an outer frame structure at a local clock rate, the FAS of ODUk 20 is not re-written but transparently transferred as received from input to the output.

Figure 2:
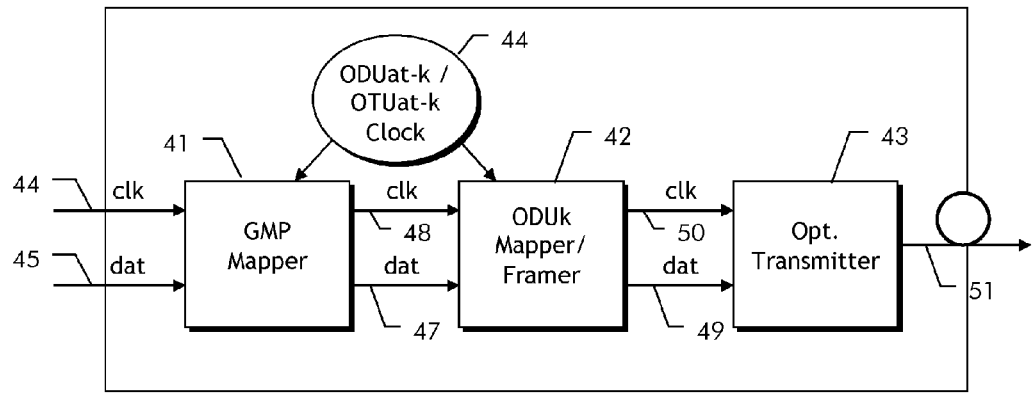
FIG. 2 shows a transmitter for encapsulating an OTUk signal into outer transport frames

FIG. 2 shows the functional building blocks of a transmitter. These blocks can be arranged for example on a line card of an OTN network node. A GMP mapper/processor 41 receives the asynchronous ODUk data signal 45 to be transmitted and a clock signal 46 thereof. The GMP processed output signal 47 and adjusted clock 48 is fed to a ODUk mapper and framer 42, which maps signal 47 synchronously into transport frames to be transmitted. The framed output signal 49 and corresponding clock 50 is fed to an optical transmitter, which modulates signal 49 onto an optical carrier and emits it onto an output optical fiber 51. A free-running clock generator 44 provides a locally generated clock signal to GMP mapper/processor 41 and to ODU mapper/framer 42.

GMP mapper/processor 41 performs a Constant Bit Rate (CBR) mapping similar to the CBR mapping into a OPU/ODU/OTUk frame defined in ITU-T Rec. G.709.

GMP is a mechanism used to accommodate the nominal bit-rate difference between a client and server layer, and the clock variations that may occur between client and server layer signals. No distinction is made between fixed and variable stuff locations. The server frame (or multi-frame) is divided into a certain number of GMP words, where each word may contain either data or stuff. Words containing data are distributed as evenly as possible, quantized to word size, across the server frame using a sigma/delta distribution algorithm.

Proper operation depends only on mapper and demapper knowing the number of data words which are filled into each frame (or multi-frame). Larger GMP word sizes are used for higher bit-rate clients to avoid the need for large barrel shifters. Additional timing information may be transmitted from the mapper to the demapper to meet the timing requirements of the client if necessary. This allows the demapper to know how many client bytes (or bits) are to be emitted by the demapper during each server frame period.

The formula governing the Sigma/Delta algorithm is as follows;

Content of each Payload position is data, if (Payload position×data byte count) mod $(P_{server})<$ data word count and stuff, if (Payload position×data byte count) mod $(P_{server})\geq$ data word count, where $P_{server}$ is the total number of word positions in the server frame payload.

$P_{server}$ is always known and fixed. Similarly, the payload position being evaluated is also inherently known. The final variable, the data word count, changes from frame to frame to match the rate of the client being mapped. For each frame, the appropriate count is determined by the mapper and signaled in the OPUk overhead to the demapper using the JC1/2/3 bytes.

The count being signaled is 14 bits, to support the 15232 payload bytes in an OPUk frame, and spans both JC1 and JC2. To ensure robustness at the receiver in the presence of bit errors, JC3 contains a CRC-8 which allows error detection and certain amount of error correction. There is also an encoding for count increments or decrements and a state machine at the receiver is used to manage the values received and protect against bit errors. The demapper requires the count before the first payload position occurs, so it has to be determined and signaled in the previous frame.

Transport frame 30, as it re-uses a similar structure than the one defined in G.709, will in the following be referred to as OTUat-k, its payload unit as OPUat-k and the data unit of transport frame as ODUat-k.

In the subject embodiment, the payload area of the ODUat-k is structured into 32-byte (256-bit) blocks. In row 1 of the ODUat-k frame the first 32-bytes will be labeled 1, the next 32-bytes will be labeled 2, and so on. The groups of 32 bytes in the ODUat-k frame payload area are numbered from 1 to 476. Blocks of 256-bit (32 Byte equivalent) of the ODUk frame from signal 48 are mapped into 32 byte block of the OTUat-k (k=4 or 3) under the control of a GMP mapping processor using the GMP justification control OH as defined in G.709 Annex D, which is incorporated by reference herein.

In this respect, every 32 Byte block of the ODUat-k payload area can carry either stuff information or 256 bit of data of the ODUk frame to be transported. This means that groups of 256 successive bits of the client signal 48 are mapped into a group of 32 successive bytes of the OPUat-k payload area under control of the GMP data/stuff control mechanism. Each group of 32 bytes in the OPUat-k payload area may either carry 256 client bits, or carry 256 stuff bits. The stuff bits are set to zero.

Figure 4:
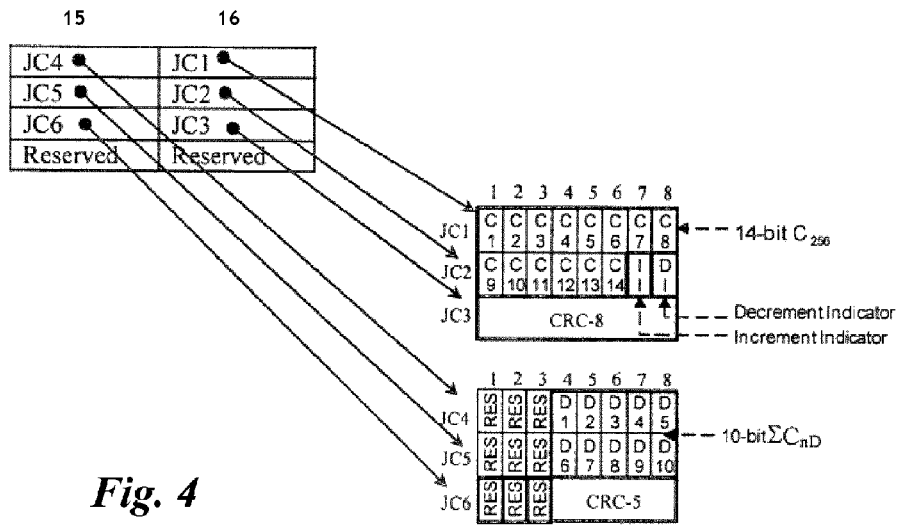
FIG. 4 shows justification information transported in an overhead field of the outer frame structure.

The justification information of the Mapping de-mapping of the transported ODUk is mapped and transported in the justification positions in column 15 and 16. For this, the information is to be encoded in alignment to G.709 Annex D. The mapping of this justification information is shown in FIG. 4.

The signal coding for the signals in the JC1 to JC6 positions is done in accordance with Annex D of ITU-T Recommendation G.709. The applicable framing is the OPUat-k equivalent and for the ODUat-k the used m is 256.

When the number $c_n$ of client n-bit data entities per server frame is not an integer, the number of client n-bit data entities Cn(t) per server frame t will vary between a maximum value (ceiling) and a minimum value (floor). In the subject case, these values are given for the mapping of ODU3 and ODU4 as shown in table 1 below.

As defined in ITU-T G.709, the rates of ODUk for k=3, 4 are:

ODU3: 239/236×39 813 120 kbit/s±20 ppm
ODU4: 239/227×99 532 800 kbit/s±20 ppm

TABLE 1

| | $C_m$ (m = 256) for transparently transported ODUk into OPUat-k (k = 3, 4) | | | | |
|---|---|---|---|---|---|
| | Floor $C_{256, min}$ | Minimum $c_{256}$ | Nominal $c_{256}$ | Maximum $c_{256}$ | Ceiling $C_{256, max}$ |
| ODU3 | 461 | 461.2030414 | 461.2214899 | 461.2399391 | 462 |
| ODU4 | 473 | 473.9977064 | 474.0166667 | 474.0356277 | 475 |

Floor $C_{m,min}$ (m=256) and Ceiling $C_{m,max}$ (m=256) values represent the boundaries of client/OPU ppm offset combinations (i.e. min. client-signal/max. OPU and max. client-signal/min. OPU). In steady state, given instances of client/OPU offset combinations should not result in generated $C_m$ values throughout this range but rather should be within a range as small as possible. Under transient ppm offset conditions, e.g. AIS to normal signal or frame jump due to protection switch, it is possible that $C_m$ values outside the range $C_{m,min}$ to $C_{m,max}$ may be generated and a GMP demapper should be tolerant of such occurrences. The maximum number of blocks in total is 476 per frame.

The rate of the outer transport frames OTUat-k, with k=3, 4 are as follows:

OPUat-3: 238/255×243/217×39,813,120 kbit/s±20 ppm
OPUat-4: 240/227×99,532,800 kbit/s±20 ppm The nominal OPUat-k rates are approximately: 41 611 131.871 kbit/s for OPUat-3 and 105,232,916.29956 kbit/s for OPUat-4.

ODUat-3: 239/255×243/217×39,813,120 kbit/s±20 ppm
ODUat-4: 239/238×240/227×99,532,800 kbit/s±20 ppm The nominal ODUat-k rates are approximately: 41,785,968.560 kbit/s for ODUat-3 and 105,675,071.41006 kbit/s for ODUat-4.

OTUat-3: 243/217×39,813,120 kbit/s±20 ppm
OTUat-4: 255/238×240/227×99,532,800 kbit/s±20 ppm The nominal OTUat-k rates are approximately 44,583,355.576 kbit/s for OTUat-3 and 112,749,553.1781 kbit/s for OTUat-4.

The rules behind the definition for the OTUat-k frames as shown above can also be used for other rates. The basic condition is that the rate of transport container when the transport OPUat-k (or other kind of container) runs at minimum rate, needs to be above the rate of the signal to be transported at maximum rate.

For any other and future rate as for instance ODU5 possibly at about 400 GBit/s, this principle could also be applied. The exact frame for optimal implementation of this principle also in terms of number of bits is a matter of optimization and can easily be chosen by those skilled in the art.

For the rates of ODUat-3, OTUat-4, the value of 256 is a preferred value, due to communality with implementations available and high bandwidth efficiency. For other rates, different value may be appropriate for reason of simplicity of divider oscillator implementation and frame mapping bandwidth efficiency.

Figure 3:
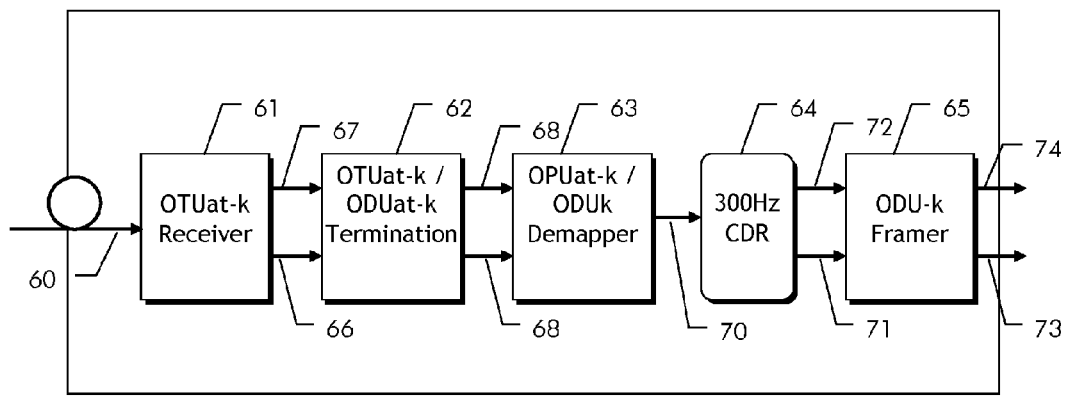
FIG. 3 shows a receiver for terminating an OTUk signal encapsulated into outer transport frames.

An optical receiver is shown in FIG. 3. It contains a coherent optical receiver 61, a de-framer 62 for terminating the section overhead of received transport frames, a demapper 63 for extracting asynchronously mapped ODUk signals from the payload unit of received transport frames, a clock data recovery circuit 64 and a framer and overhead processor 65 for extracted ODUk frames.

Coherent optical receivers as such are well known in the art. The principles and design of an optical coherent receiver are described in the article "Real-Time Implementation of Digital Signal Processing for Coherent Optical Digital Communication Systems" by A. Leven et al, IEEE Journal of Selected Topics in Quantum Electronics, vol. 16 no. 5, September/October 2010, pp. 1227-1234, which is incorporated by reference herein.

The main building blocks of a coherent optical receiver are a free-running local oscillator (LO) laser, an optical hybrid for mixing the transmitted optical signal with the LO laser signal, two pairs of balanced photodetectors, variable-gain amplifiers, analog-to-digital converters (ADC), and a digital signal processor (DSP) unit, which performs digital signal processing on the digitized analog signals to recover the transmitted symbol values.

The digital processing includes chromatic dispersion compensation, clock recovery and retiming, polarization de-rotation and compensation of polarization mode dispersion (PMD), carrier phase and frequency estimation, and finally a symbol value estimation.

These digital signal processing steps require adaptation of filter parameters, which require blind adaptation and take time to converge. Therefore, frame or frequency transients in the input signal would disturb coherent detection and would require a new adaptation process until the signal can be received properly. Therefore, the present embodiments avoid frame or frequency transients by encapsulating signals to be transported into an outer frame structure generated at a local clock that is valid for only a particular fiber section and that does not need synchronization from any synch source, be it the input clock of the signal to be transported or an internal or external network element clock, with the transmitting network node.

The output of optical receiver 61 is clock and data signals 66, 67, which are fed to frame termination unit 62. This de-framer terminates the overhead of received transport frames and performs FEC processing to correct potential transmission errors.

The output of de-framer 62 is sent to GMP demapper 63, which extracts the asynchronously embedded ODUk signal. The result is the native ODUk signal that was originally encapsulated into the received transport frames. This signal 70 is fed to clock data recovery (CDR) block 64, which has a 300 Hz bandwidth PLL to remove phase jitter resulting from the GMP mapping and stuffing mechanism. The filtered clock 72 and data signal 71 are fed to ODU framer, which implements standard ODU overhead processing and provides the ODUk frames 73 and clock 74 to a standard ODUk interconnection function (not shown) of the receiving network element.

The most fundamental interconnection function would be to connect the optical receiver from FIG. 3 (data and clock outputs 73, 74) back to back to the optical transmitter from FIG. 2 (data and clock inputs 46, 45), thus implementing a 3R regenerator (3R: Re-amplifying-Reshaping-Retiming). Other, more flexible interconnection functions can be implemented through space or space/time switching matrices, thus implementing crossconnection functions in a network element with multiple input and output ((I/O) interfaces or line cards.

Figure 5:
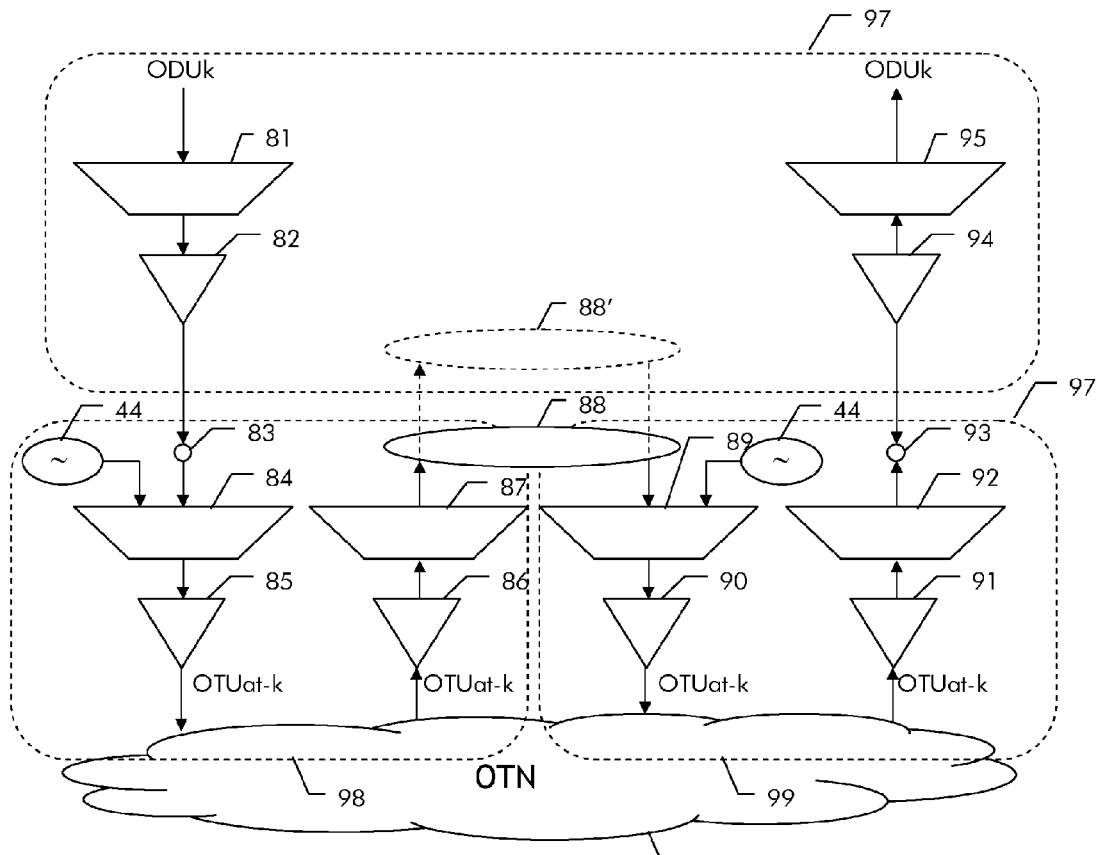
FIG. 5 shows an information flow diagram using asynchronous encapsulation.

FIG. 5 shows an ITU-T style network and information flow diagram for the transport of an ODUk signal using OTUat-k encapsulation. Function 81 is the standard ODUk/OTUk adaptation function and function 82 is the source side OTUk termination function. This occurs within ODUk/OTUk clock domain 97. At point 83, the ODUk/OTUk to be transported enters a the OTUat-k clock domain 98 of local clock 44 and is handled as a constant bit rate (CBR) signal. Function 84 is the OTUk/OTUat-k adaptation function and function 85 is the source side OTUat-k termination function. OTUk/OTUat-k adaptation function 84 includes the GMP mapping and stuffing process.

The signal is then connected through OTN 80. At an intermediate network element, the OTUat-k signal enters sink side OTUat-k termination function 86 and adaptation function 87. The signal can then be adapted at either an OTUat-k sublayer connection point 80 or a CBR signal connection point 80'. Accordingly, adaptation function 87 is either an OTUat-k sublayer adaptation function or an OTUk/OTUat-k adaptation function.

Through connection points 80, 80', the signal enters a new local clock OTUat-k domain 99 and is subject to an OTUat-k adaptation function including mapping and stuffing operations. Function 90 performs then a source-side OTUat-k termination function and the signal is connected through OTN 80 to a destination network element.

At the destination, the signals is subject to a sink-side OTUat-k termination function 91 and an OTUk/OTUat-k adaptation function to extract the transported OTUk as a CBR signal 93, where it is fed back to the original OTUk clock domain 97 and undergoes conventional OTUk termination 94 and ODUk/OTUk adaptation 95 functions.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of transmitting an asynchronous transport signal over an optical fiber section of an Optical Transport Network, comprising:
    receiving said asynchronous transport signal, said asynchronous transport signal having a frame structure referred to as Optical Transport Module of size k (OTU-k) frames, each OTU-k frame comprising a frame alignment signal and a higher order Optical Data Unit, being an Optical Data Unit of size k (ODU-k) frame, with an overhead section and a payload section, said ODU-k frame representing a switchable transport entity within said Optical Transport Network and being synchronously mapped into a corresponding ODU-k frame;
    encapsulating said OTU-k frames into outer transport frames offering a payload rate higher than a nominal bit rate of said OTU-k frames;
    generating an output optical signal comprising said outer transport frames with said encapsulated OTU-k frames using a locally generated clock; and
    transmitting said output optical signal over said optical fiber section;
    wherein said encapsulating comprises:
    adapting the bit rate of said OTU-k frames to the payload rate of said outer transport frames derived from said locally generated clock through a justification and stuffing process; and
    synchronously mapping the rate adapted OTU-k frames into said outer transport frames at the rate of said locally generated clock.

2. The method according to claim 1, wherein said locally generated clock is a free-running, unsynchronized clock.

3. The method according to claim 1, wherein said justification and stuffing process uses a fixed word size, where each word may contain either data or stuff and a Sigma/Delta algorithm for determining a distribution of words containing data and words containing stuff.

4. The method according to claim 3, wherein said justification and stuffing process comprises a Generic Mapping Procedure as defined in ITU-T G.709, Annex D.

5. The method according to claim 3, wherein said fixed block size is 256 bit.

6. The method according to claim 1, comprising adding Forward Error Correction bytes to said outer transport frames.

7. The method according to claim 1, wherein prior to encapsulating said asynchronous transport signal, Forward Error Correction bytes contained in said asynchronous signal when it is received, are removed and errors corrected.

8. A transmitter for use in an Optical Transport Network, comprising:
    an input adapted to receive an asynchronous transport signal, said asynchronous transport signal having a frame structure referred to as Optical Transport Module of size k (OTU-k) frames, each OTU-k frame comprising a frame alignment signal and a higher order Optical Data Unit, being an Optical Data Unit of size k (ODU-k) frame, with an overhead section and a payload section, said ODU-k frame representing a switchable transport entity within said Optical Transport Network and being synchronously mapped into a corresponding OUT-k frame;
    a local clock generator adapted to generate a local clock;
    circuitry adapted to encapsulate said OTU-k frames into outer transport frames offering a payload rate higher than a nominal bit rate of said OTU-k frames;
    wherein said circuitry comprises:
    a mapper for adapting the bit rate of said OTU-k frames to the payload rate of said outer transport frames derived from said locally generated clock through a justification and stuffing process; and
    a framer adapted to synchronously map the rate adapted OTU-k frames into said outer transport frames at the rate of said local clock;
    said transmitter further comprising an optical transmitter adapted to generate an output optical signal comprising said outer transport frames with said encapsulated OTU-k frames.

9. The transmitter according to claim 8, wherein said circuitry comprises a GMP processor.

10. The transmitter according to claim 8, wherein said clock generator comprises a free-running oscillator.

11. The transmitter according to claim 10, wherein said oscillator has an accuracy of ±20 ppm.

12. A network element for use in an Optical Transport Network, comprising one or more transmitters according to claim 8 and one or more receivers and one or more elements performing interconnection functions.

13. A receiver for use in an Optical Transport Network, comprising:
    a coherent optical receiver adapted to electrically recover clock and data of a received optical signal;
    a frame termination unit adapted to terminate transport frames that carry an asynchronously mapped asynchronous transport signal, said asynchronous transport signal having a frame structure referred to as Optical Transport Module of size k (OTU-k) frames, each OTU-k frame comprising a frame alignment signal and a higher order Optical Data Unit, being an Optical Data Unit of size k (ODU-k) frame, with an overhead section and a payload section, said ODU-k frames representing a switchable transport entity within said Optical Transport Network and being synchronously mapped into a corresponding OTU-k frame;
    a demapper adapted to extract said asynchronously mapped OTU-k frames from payload areas of said transport frames;
    a clock data recovery circuit adapted to filter a clock of the extracted OTU-k frames; and an ODU overhead processor adapted to process ODU overhead of said OTU-k frames contained in said OTU-k frames.

14. The receiver according to claim 13, wherein said clock data recovery circuit has a bandwidth of 300 Hz or less.

* * * * *